US009857872B2

(12) United States Patent
Terlizzi et al.

(10) Patent No.: US 9,857,872 B2
(45) Date of Patent: Jan. 2, 2018

(54) MULTI-TOUCH DISPLAY SCREEN WITH LOCALIZED TACTILE FEEDBACK

(75) Inventors: Jeffrey J. Terlizzi, San Francisco, CA (US); Jahan Minoo, South San Francisco, CA (US)

(73) Assignee: Apple Inc., Cupertino, CA (US)

( * ) Notice: Subject to any disclaimer, the term of this patent is extended or adjusted under 35 U.S.C. 154(b) by 993 days.

(21) Appl. No.: 12/069,352

(22) Filed: Feb. 8, 2008

(65) Prior Publication Data

US 2009/0167704 A1    Jul. 2, 2009

Related U.S. Application Data

(60) Provisional application No. 61/009,615, filed on Dec. 31, 2007.

(51) Int. Cl.
*G06F 3/01* (2006.01)
*G06F 3/0488* (2013.01)
*G09B 23/28* (2006.01)

(52) U.S. Cl.
CPC .......... *G06F 3/016* (2013.01); *G06F 3/04886* (2013.01); *G09B 23/28* (2013.01)

(58) Field of Classification Search
CPC ................. G06F 3/017; G06F 3/0488; G06F 2203/04808
USPC ................. 345/173–183; 455/575.1–575.9; 463/1–69; 178/18.01–18.11, 19.01–19.07
See application file for complete search history.

(56) References Cited

U.S. PATENT DOCUMENTS

| 5,296,871 | A  | * | 3/1994  | Paley ........................... 345/163 |
| 5,379,057 | A  |   | 1/1995  | Clough et al. |
| 5,675,362 | A  |   | 10/1997 | Clough et al. |
| 6,812,623 | B2 | * | 11/2004 | Takeda et al. ................. 310/359 |
| 7,602,384 | B2 | * | 10/2009 | Rosenberg et al. ........... 345/173 |
| 2003/0184574 | A1 |   | 10/2003 | Phillips et al. |
| 2005/0017947 | A1 | * | 1/2005  | Shahoian et al. .............. 345/156 |
| 2006/0026536 | A1 | * | 2/2006  | Hotelling et al. ............. 715/863 |
| 2006/0049920 | A1 | * | 3/2006  | Sadler et al. .............. 340/407.1 |
| 2006/0050059 | A1 | * | 3/2006  | Satoh et al. .................. 345/173 |

(Continued)

FOREIGN PATENT DOCUMENTS

CA    2 518 914 A1    9/2004
WO    2008151863 A1   12/2008

OTHER PUBLICATIONS

Notification of Transmittal of the International Search Report and Written Opinion of the International Searching Authority, or the Declaration, issued in International Application No. PCT/US2008/008682, dated Jan. 13, 2009.

(Continued)

*Primary Examiner* — Gene W Lee
(74) *Attorney, Agent, or Firm* — Brownstein Hyatt Farber Schreck, LLP (57) ABSTRACT

Systems, methods, computer-readable media, and other means are described for utilizing touch-based input components that provide localized haptic feedback to a user. The touch-based input components can be used and/or integrated into any type of electronic device, including laptop computers, cellular telephones, and portable media devices. The touch-based input components can use, for example, a grid of piezoelectric actuators to provide vibrational feedback to a user, while the user scrolls around a click wheel, slides across a trackpad, or touches a multi-touch display screen.

11 Claims, 7 Drawing Sheets

(56) References Cited

U.S. PATENT DOCUMENTS

| | | | |
|---|---|---|---|
| 2006/0097991 A1 | 5/2006 | Hotelling et al. | |
| 2006/0197753 A1* | 9/2006 | Hotelling | 345/173 |
| 2006/0267963 A1 | 11/2006 | Pryor | |
| 2007/0132710 A1* | 6/2007 | Tateuchi et al. | 345/102 |
| 2008/0012826 A1* | 1/2008 | Cunningham et al. | 345/156 |
| 2008/0024459 A1 | 1/2008 | Poupyrev et al. | |
| 2008/0132313 A1* | 6/2008 | Rasmussen et al. | 463/16 |
| 2009/0002328 A1* | 1/2009 | Ullrich et al. | 345/173 |
| 2009/0058829 A1 | 3/2009 | Kim et al. | |
| 2009/0166098 A1 | 7/2009 | Sunder | |
| 2009/0167508 A1 | 7/2009 | Fadell et al. | |
| 2009/0167704 A1 | 7/2009 | Terlizzi et al. | |

OTHER PUBLICATIONS

Arai, F., et al., "Transparent tactile feeling device for touch-screen interface", Robot and Human Interactive Communication, 2004. Roman 2004. 13$^{th}$ IEEE International Workshop on Kurashiki, Okayama, Japan 20-22 Sep. 2004, Piscataway, NJ, USA Sep. 20, 2004, pp. 527-532, XP010755191.

* cited by examiner

MULTI-TOUCH DISPLAY SCREEN WITH LOCALIZED TACTILE FEEDBACK

This application is a nonprovisional of U.S. Provisional Patent Application No. 61/009,615, filed Dec. 31, 2007, which is hereby incorporated by reference in its entirety.

FIELD OF THE INVENTION

This invention relates to a multi-touch display screen capable of providing localized tactile, or haptic, feedback to a user as the user navigates a touch-based user interface.

BACKGROUND OF THE INVENTION

Conventional touch pads, such as those used as mouse pads on laptop computers, require a user to view a separate display screen while interacting with the touch pad. Virtual buttons, icons and other textual and graphical display elements are presented to the user and, by moving a finger or stylus on the touch pad, the user can navigate a cursor and/or select various display elements.

Some display screens can also be used as a touch based input component. These touchscreens are capable of displaying various text and graphics to a user, which the user can select by touching the touchscreen. More specifically, touchscreens can be configured to display virtual buttons and other types of options to the user. The user may select a virtual button by tapping the portion of the touchscreen where the virtual button is being displayed. The locations, shapes and sizes of virtual buttons, unlike physical buttons, can be dynamic and change with each menu or display that is presented to the user. This allows the same physical space to represent different input elements at different times.

More recently, multi-touch display screens have been described and incorporated into handheld media players, such as Apple Inc.'s iPhone™. (Apple Inc. owns the iPhone™ trademark.) Multi-touch display screens are specialized touchscreens that can detect more than one simultaneous touch events in different locations on the touchscreen. With such devices, a user may move one or more fingertips across the touchscreen in a pattern that the device translates into an input command. The device may then respond accordingly. One pattern of finger movements (such as a pinching motion) may, for example, zoom in on a picture, while another pattern of finger movements (such as a reverse pinching) may zoom out.

Multi-touch display screens usually include a transparent touch panel and visual display component. The touch panel comprises a touch sensitive surface and is often positioned in front of the display screen. In this manner, the touch sensitive surface covers the viewable area of the display screen and, in response to detecting a touch event, generates a signal that can be processed and utilized by other components of the electronic device. Multi-touch display screens are discussed in more detail in commonly assigned U.S. Patent Publication No. US 2006/0097991, entitled "MULTIPOINT TOUCHSCREEN," which is incorporated by reference herein in its entirety.

However, one of a touchscreen's biggest advantages (i.e., the ability to utilize the same physical space for different functions) is also one of a touchscreen's biggest disadvantages. When the user is unable to view the display (because the user is occupied with other tasks), the user can only feel the smooth, hard surface of the touchscreen, regardless of the shape, size and location of the virtual buttons and/or other display elements. This makes it difficult for users to find icons, hyperlinks, textboxes, or other user-selectable input elements that are being displayed, if any are even being displayed, without looking at the display. But, in some instances, it may be inconvenient, or even dangerous, for the user to look at the display. Unless touch input components are improved, users that, for example, drive a motor vehicle, may avoid devices that have a touch input component and favor those that have a plurality of physical input components (e.g., buttons, wheels, etc.). The present invention improves on nearly all kinds of touch input components that are used in conjunction with a display screen.

SUMMARY OF THE INVENTION

The present invention includes systems, methods, computer readable media and other means for providing localized tactile, or haptic, feedback to a user of a touchscreen electronic device. The haptic feedback can take any form, including vibration, and can be paired with other non-visual feedback such as audible noise. The present invention may utilize a grid of piezoelectric actuators to provide haptic feedback that enables a user to non-visually navigate a visual display.

In some embodiments of the present invention, a user input component includes a touch-sensitive surface and a grid of piezoelectric actuators. The grid of piezoelectric actuators may be transparent or opaque. An individual piezoelectric actuator can be activated by applying control signals to its top and bottom electrodes. In some embodiments, the actuators may share a common electrode in the form of a backplane.

In some embodiments of the present invention, the user input component can be integrated into an electronic device having a display screen. For example, the user input component can be used and/or integrated into any type of electronic device, including laptop computers, cellular telephones, and portable media devices. The present invention may also utilize a user input component integrated with a display screen, such as a touchscreen.

The display screen can be used to present a visual display which includes a virtual button. A haptic feedback response can be associated with the virtual button. The haptic feedback response can be provided while the virtual button is included in the visual display, or in response to a touch event. For example, the virtual button can vibrate when a touch event occurs in proximity to the virtual button. In addition to virtual buttons, the display can include other user-selectable display elements.

For example, the visual display can include a virtual click wheel associated with a haptic feedback response. For example, the virtual button at the center of the virtual click wheel can vibrate at a different frequency than the virtual wheel surrounding it. The virtual wheel and the virtual button at the center can vibrate while they are included in the visual display, or in response to a touch event. By providing dynamic, localized, haptic feedback at the location of the virtual click wheel, the present invention enables a user to find and operate the virtual click wheel non-visually.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Recent developments in technology allow smaller electronic devices to have increased functionality. However, as more functionality is packed into smaller devices, the user interface component(s) of the electronic devices (e.g., keyboard, number pad, click wheel, etc.) are increasingly becoming the limiting factor.

One solution is to utilize a touchscreen user interface component. A touchscreen user interface component enables the same physical space to be used a number of ways. A single touchscreen user interface component can be used instead of a plurality of other user input and display components.

However, as discussed briefly above, touch-based user interface components can present various challenges to visually impaired users, especially when the touch-based user interface component is used in conjunction with a display screen. As used herein, the phrase "visually impaired" refers to users that are permanently visually impaired (e.g., blind) or temporarily visually impaired (e.g., able to see, but are unable or unwilling to divert their attention to their electronic device's display screen, because there is not enough light to see, they are driving, etc.). Police officers, for example, sometimes have a laptop computer in their patrol cars. A laptop computer's mouse pad that is in accordance with the present invention, could provide haptic feedback to the officer, so that the officer does not have to look at the computer screen while driving.

Audio cues and/or specialized menu hierarchies, for example, could also assist visually impaired users when interacting and utilizing their touchscreen devices. In such embodiments, the display component can be omitted from the electronic device altogether. Systems, methods, computer readable media and other means for utilizing a multi-touch user interface component in the absence of a visual display are discussed in more detail in commonly assigned U.S. Patent Application Publication No. 2009-0166098, published Jul. 2, 2009, entitled "NON-VISUAL CONTROL OF MULTI-TOUCH DEVICE", which is incorporated herein by reference in its entirety.

Although the present invention could be used in conjunction with audio cues and/or specialized menu hierarchies, the present invention could just as easily be used in the absence of specialized audio cues and/or menu hierarchies. The present invention, among other things, can provide haptic feedback to help a user find a virtual button or other user-selectable input element with a touch-based input component. Localized dynamic haptic feedback can enable, for example, a visually impaired user to feel what is being displayed, locate a virtual button and select the virtual button by tapping it. Additional systems, methods, computer readable media and other means for combining dynamic haptic feedback with a touch-based input components, as well as examples of when and how to use dynamic haptic feedback are discussed in more detail in commonly assigned U.S. Patent Application Publication No. 2009-0167508, published Jul. 2, 2009, entitled "TACTILE FEEDBACK IN AN ELECTRONIC DEVICE", which is hereby incorporated herein by reference in its entirety.

Among other things, the present invention teaches how to provide dynamic, localized haptic feedback. Throughout this disclosure, examples related to a touchscreen input component of a portable media device are used to describe the present invention. One skilled in the art will appreciate that dynamic, localized haptic feedback can be used with any type of surface and/or input component of any type of device. For example, dynamic haptic feedback can be integrated into a motor vehicle's steering wheel, stereo system, audio volume knob, television remote control, computer peripheral device, doorknob, chair, mouse pad, and/or any other device or component of a device. One skilled in the art will also appreciate that dynamic, localized, haptic feedback can be provided using any touch-based sensation including vibration, heat, shock, and/or any other sensation a user can feel.

Figure 1:
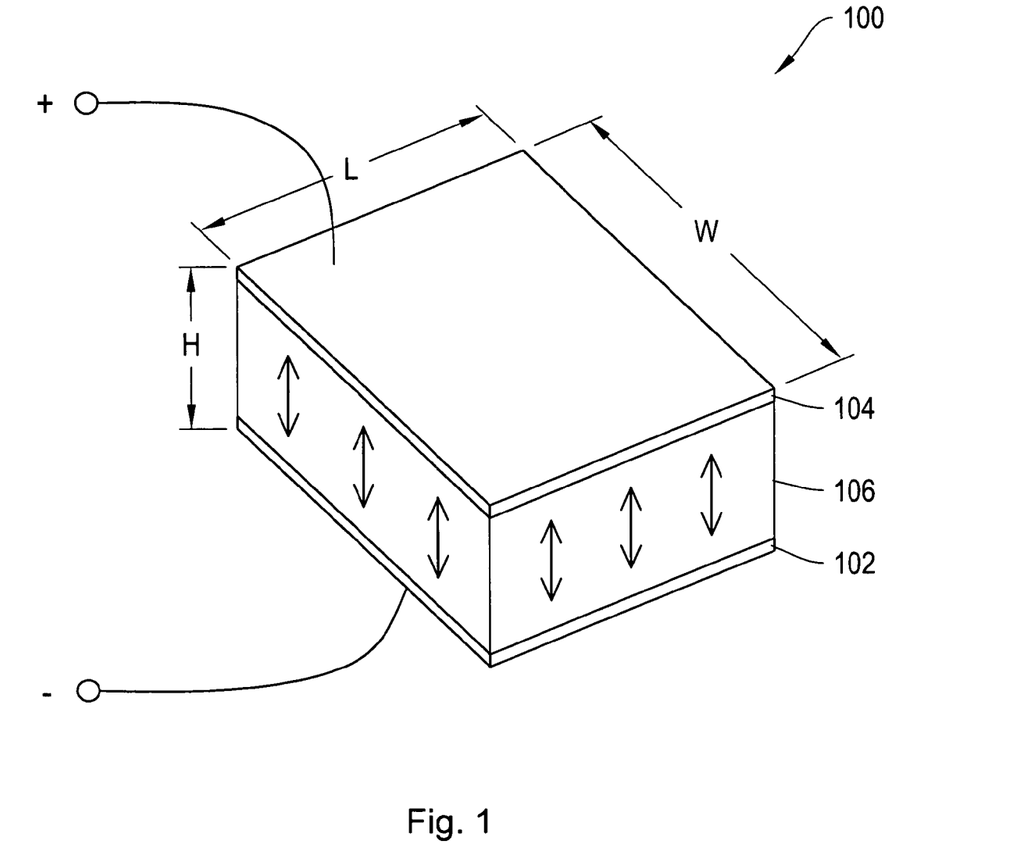
FIG. 1 shows an illustrative cross-section of an exemplary transparent piezoelectric actuator in accordance with some embodiments of the present invention.

FIG. 1 shows an exemplary, cross-sectional view of piezoelectric actuator 100, which is in accordance with some embodiments of the present invention. The surface area of piezoelectric actuator 100 can be, for example, 10 square millimeters, 10 square micrometers, 10 square nanometers, or any other size that is physically possible.

Piezoelectric actuator 100 includes electrodes 102 and 104 and piezoelectric material 106, any or all of which can be transparent, opaque, or a combination thereof. Piezoelectric material 106 can include, for example, one or more natural crystals (such as, e.g., Berlinite, cane sugar, quartz, Rochelle salt, topaz, and/or any tourmaline group mineral (s)), man-made crystals (such as, e.g., Gallium orthophosphate or langasite), ceramics, bone, polymers, and/or any other material that is able to mechanically deform in response to an applied electric potential, which is sometimes referred to herein as the piezoelectric effect. Piezoelectric material 106 is sandwiched between transparent electrodes 102 and 104. In the present invention, the materials used in electrodes 102 and 104 can allow electrodes 102 and 104 to be flexible while withstanding the deflection associated with the touchscreen.

When a sufficient voltage is applied to electrodes 102 and/or 104, piezoelectric material 106 can expand in the H direction. The voltage must be sufficient to generate the piezoelectric effect. For example, a voltage of 20V can be sufficient, depending on the material used for piezoelectric material 106.

When the voltage is removed from electrodes 102 and 104, or when the voltage is less than the threshold voltage required to initiate the piezoelectric effect, piezoelectric material 106 returns to its original dimensions.

Piezoelectric actuator 100 can thus be made to vibrate by applying a control signal with an amplitude and frequency to one or both of electrodes 102 and 104, such that piezoelectric actuator 100 expands and contracts at that frequency.

In some embodiments, the voltage across piezoelectric material 106 can be generated by keeping one electrode at a constant voltage and applying a control signal to the other electrode. For example, 20V can be applied to electrode 102. The control signal can be a square wave with an amplitude between 0V and 20V, and a frequency in the sub-audible range. When the control signal is applied to electrode 104, piezoelectric actuator 100 vibrates at the frequency of the control signal. One skilled in the art will appreciate that the control signal is not limited to square waves, sub-audible frequencies or voltage amplitudes less than 20V, and that any type of wave, frequency, amplitude and combination thereof can be used without departing from the spirit of the present invention.

In other embodiments, control signals can be applied to both electrodes. The voltage across piezoelectric material 106 can be generated by applying a first control signal to one electrode and applying a second control signal to the other electrode. The first control signal can be, for example, a square wave with an amplitude between 0V and 20V, and a frequency in the sub-audible range. The second control signal can be a signal having the same amplitude and frequency as the first control signal, but 90 degrees out-of-phase with the first control signal. In one half-period, the first control signal is at 20V and the second control signal is at 0V. In the second half-period, the first control signal is at 0V and the second control signal is at 20V. In this embodiment, the piezoelectric material 106 can contract and expand more rapidly than in the embodiment described in the previous paragraph.

Figure 2:
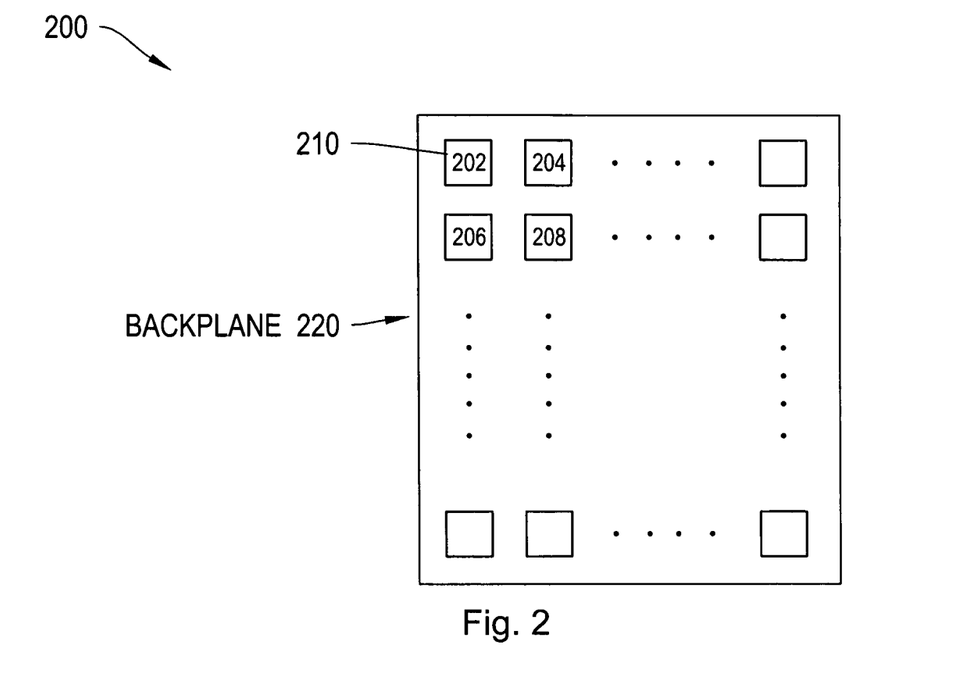
FIG. 2 shows an exemplary grid of individually-addressable transparent piezoelectric actuators.

FIG. 2 shows grid 200, which is a simplified example of a plurality of piezoelectric actuators, wherein each of the piezoelectric actuators are the same as or similar to piezoelectric actuator 100 of FIG. 1. Each piezoelectric actuator can be individually-controlled. The piezoelectric actuators of grid 200 are shown as being arranged in rows and columns. In some embodiments, two or more piezoelectric actuators can be grouped together and controlled as a single entity. For example, two or more piezoelectric actuators can be grouped together to represent a virtual button. One skilled in the art would appreciate that the piezoelectric actuators can be grouped in any manner and collectively form any shape.

In some embodiments of the present invention, backplane 220 represents an electrically conductive material that functions as the top electrode, such as, e.g., electrode 104 of FIG. 1, of all the piezoelectric actuators in the grid. Similarly, electrodes 202, 204, 206, and 208, represent electrically conductive material that functions as the bottom electrode, such as, e.g., electrode 102 of FIG. 1. A voltage potential across a piezoelectric actuator's piezoelectric material can be created when the backplane 220 and the control electrode are different. When the voltage potential exceeds the threshold of the piezoelectric actuator's piezoelectric material (e.g., piezoelectric material 106 of FIG. 1), the piezoelectric material expands. For example, if the threshold voltage of piezoelectric material is 15V, the piezoelectric actuator can be activated when 10V is applied to backplane 220 and −10V is applied to its control electrode. A plurality of piezoelectric actuators can be activated by applying control signals to more than one control electrode. One skilled in the art would appreciate that the top electrode of each piezoelectric actuator can also be isolated from the top electrodes of other piezoelectric actuators so that both the top and bottom electrodes of a piezoelectric actuator are controlled individually.

The piezoelectric actuators of grid 200 are shown as being arranged in a pattern resembling the pixels of a visual display screen, but the piezoelectric actuators' dimensions can be independent from or related to the dimensions of the pixels in the display screen. For example, each piezoelectric actuator can have a larger, smaller or the same physical dimensions as a typical pixel in the display screen. Because a finger press on a touch screen typically measures 1 cm×1 cm, these piezoelectric actuators may be as large as 1 cm×1 cm. However, each piezoelectric actuator can be a fraction of that size (e.g., 1 mm×1 mm), which can enable a more precise, localized tactile response. The piezoelectric actuators may be as small as fabrication technology permits. One skilled in the art will appreciate that, despite the actuators shown in FIG. 2 having the same physical dimensions, the piezoelectric actuators can be any size, or combination of sizes without departing from the spirit of the present invention. For example, the piezoelectric actuators can be larger around the edges of the touchscreen and proportionately smaller towards the middle of the touchscreen. One skilled in the art would also appreciate that the space between piezoelectric actuators and/or the piezoelectric actuators' piezoelectric material can also be adjusted accordingly.

Figure 3:
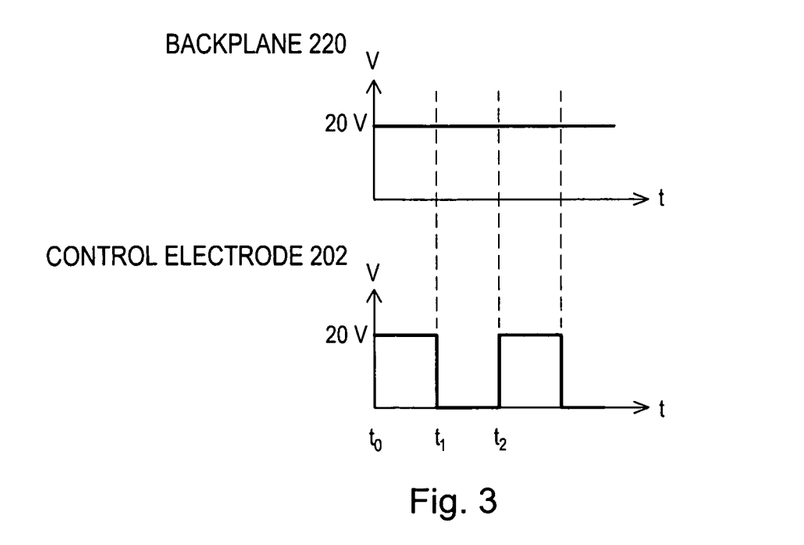
FIG. 3 shows exemplary control signals for selectively activating an individual piezoelectric actuator.

FIG. 3 shows exemplary voltage waveforms in the time domain that represent control signals for a particular piezoelectric actuator, such as piezoelectric actuator 210. For example, piezoelectric actuator 210 can be selectively activated by applying a steady voltage to backplane 220 and applying a control signal to control electrode 202 (which causes, e.g., a voltage difference above a preconfigured threshold). Backplane 220 is shown in FIG. 3 as being maintained at 20V by the electronic device. During the first half-period (i.e., between t0 and t1), control electrode 202 is shown at 20V, thereby creating a 0V potential difference across piezoelectric actuator 210. With a 0V potential difference, piezoelectric actuator 210 will remain at its original dimensions. During the second half-period (i.e., between t1 and t2), control electrode 202 is at 0V, thereby creating a 20V potential across piezoelectric actuator 210. With a 20V potential across piezoelectric actuator 210 (and assuming 20V is greater than the threshold voltage of the piezoelectric material of piezoelectric actuator 210), piezoelectric actuator 210 is activated and expands. When the next wave cycle begins at t3, the voltage potential returns to 0V and the piezoelectric actuator returns to its original dimensions. A user may feel a vibration when a piezoelectric actuator repetitively expands and contracts (i.e., returns to its original dimensions).

Varying the frequency of the control signal applied to the backplane, and/or the control electrode can cause a variation in the frequency at which a piezoelectric actuator expands and contracts. Varying the amplitude of the control signal applied to the control electrode can vary the amount by which the piezoelectric material expands, which the user may feel as an increase or decrease in the strength of the vibration.

In some embodiments, the waveform of the control signals, the frequency of the control signals, and/or the amplitude of the control signals can be adjusted by the user.

In some embodiments, the present invention can be integrated with a speaker to provide audible sounds to a user. Control signals can also be applied to electrodes, such as electrodes 102 and 104 of FIG. 1, to generate vibrations in the audible range. This may cause the piezoelectric actuator to emit an audible signal.

Figure 4:
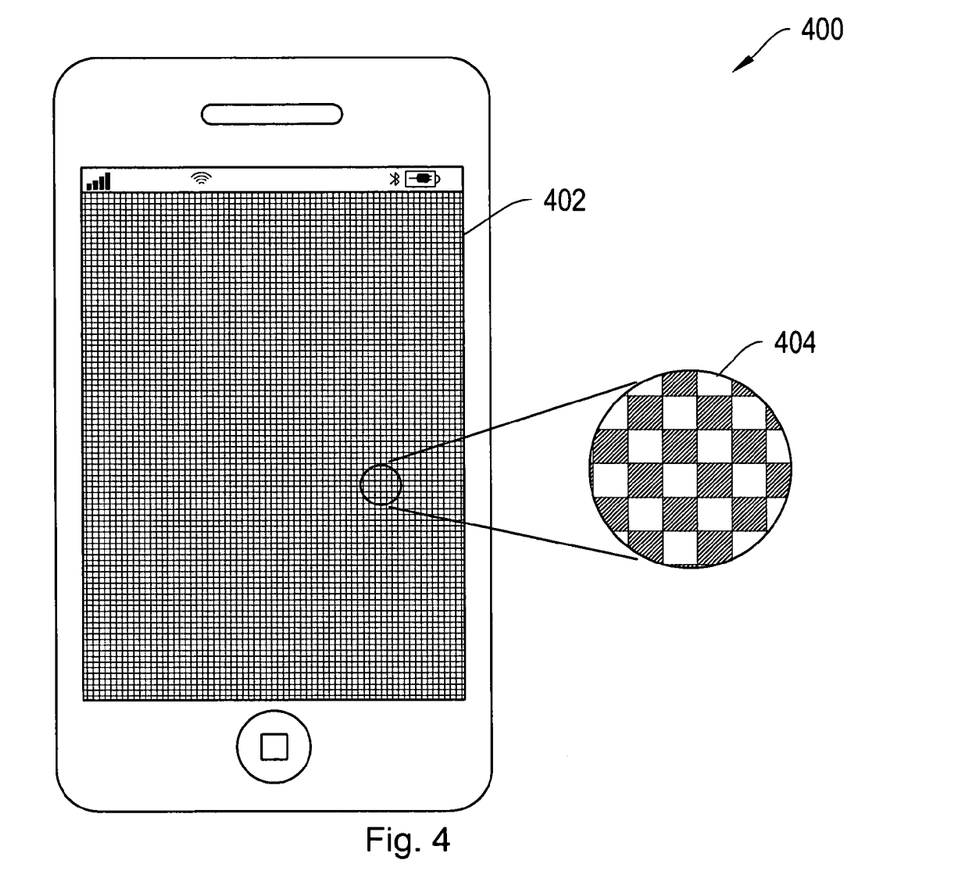
FIG. 4 shows an exemplary electronic device with a touchscreen that is configured to provide localized tactile feedback in accordance with some embodiments of the present invention.

FIG. 4 shows exemplary electronic device 400, which is in accordance with the principles of the present invention and includes touchscreen input component 402. Electronic device 400 can function as, for example, a media device, communications device, digital camera, video camera, storage device, or any other electronic device.

Touchscreen input component 402 includes a surface capable of providing dynamic localized haptic feedback. For example, touchscreen input component 402 can include a number of actuators, which are shown in a planar configuration as a grid of transparent piezoelectric actuators. Exploded view 404 shows the individual actuators. Although half of the actuators are shown in exploded view 404 as being shaded, one skilled in the art will appreciate that all of the actuators can be transparent, or in other embodiments opaque, or a combination thereof. Exploded view 404 also depicts the individual piezoelectric actuators as being arranged in a grid comprising rows and columns, such as those discussed above.

Figure 5:
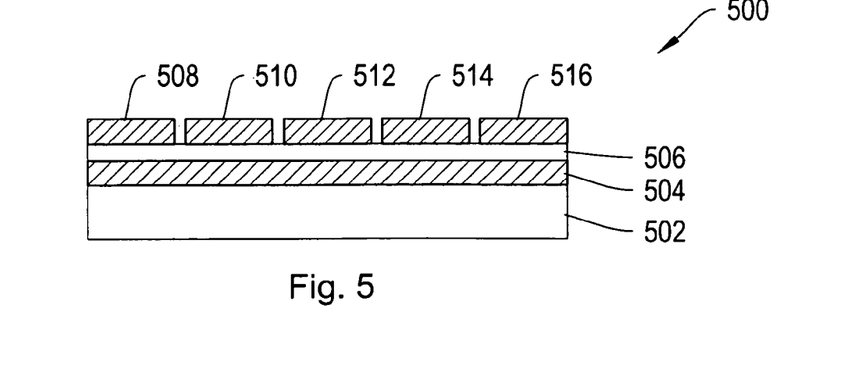
FIG. 5 shows a cross-section of the side of an exemplary grid of transparent piezoelectric actuators overlaying a touchscreen.

FIG. 5 shows cross-section 500, which includes an exemplary grid of piezoelectric actuators, overlaying a touchscreen input component such as, e.g., touchscreen input component 402 of FIG. 4. Transparent electrode 504 can be disposed above touchscreen input component 502. In cross-section 500, transparent electrode 504 is continuous in the lateral dimension. Transparent electrode 504 can be one of a plurality of electrodes disposed laterally above touchscreen input component 502, but other transparent electrodes disposed laterally are not visible in this depiction because they run parallel to the view shown in cross-section 500. Disposed above transparent electrode 504 is transparent piezoelectric material 506. Cross-section 500 shows, transparent electrodes 508, 510, 512, 514, and 516 as being disposed above transparent piezoelectric material 506. Transparent electrodes 508, 510, 512, 514, and 516 are disposed orthogonally to transparent electrode 508. Although the grid of transparent piezoelectric actuators is depicted here above the touchscreen, in other embodiments, the grid of transparent piezoelectric actuators may be disposed behind the touchscreen input component 502 and/or integrated into touchscreen input component 502.

Figure 6:
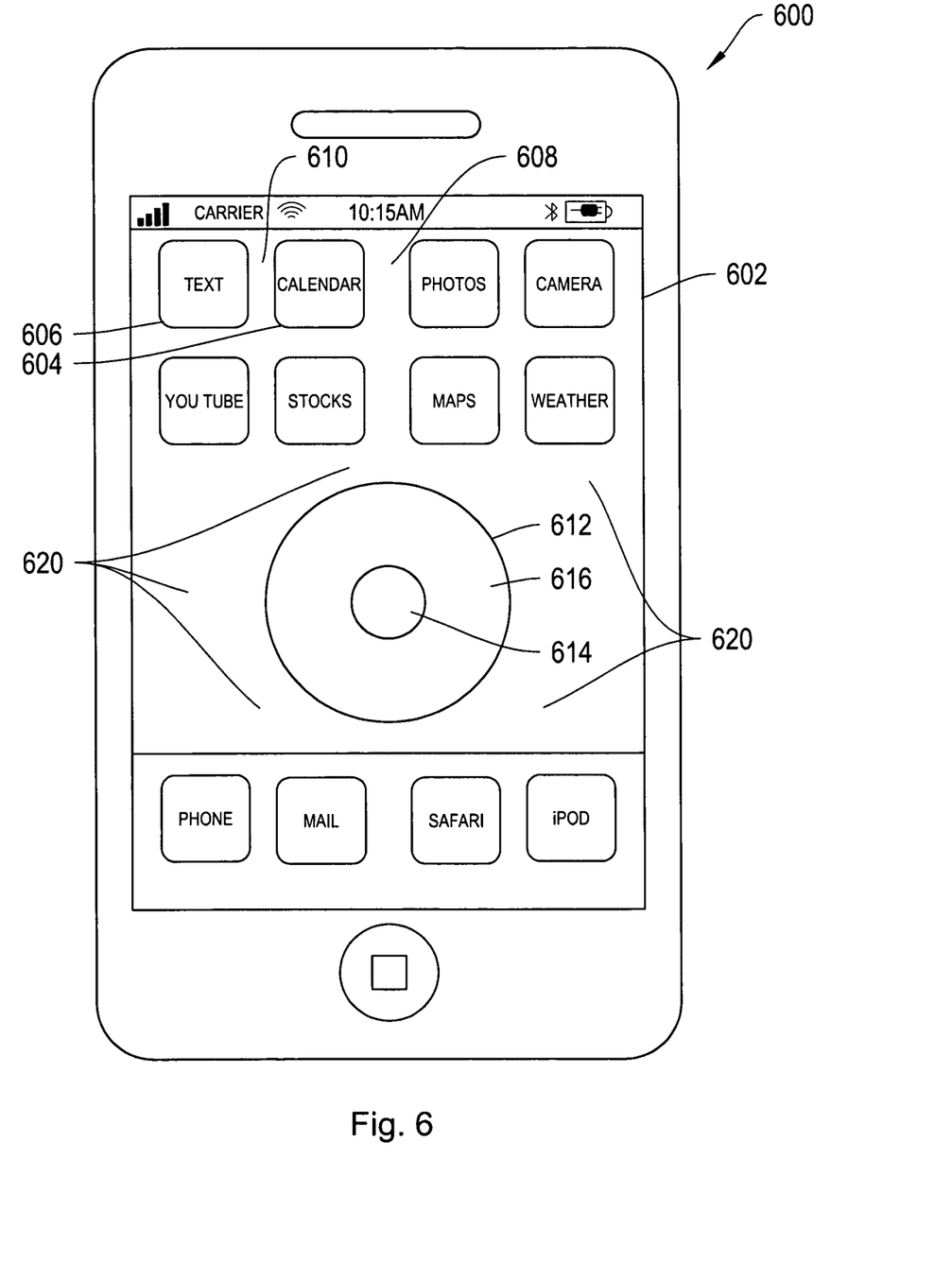
FIG. 6 shows an exemplary graphical user interface that may be presented by a device comprising a touchscreen input component.

FIG. 6 shows electronic device 600, which is presenting exemplary display 602. Display 602 includes a number of display elements, such as virtual button 604, virtual button 606, empty space 608, empty space 610 and virtual scroll wheel 612. Some of the display elements included in display 600, such as, e.g., virtual buttons 604 and 606 as well as virtual scroll wheel 612 are user-selectable. In response to a touch event occurring in proximity to a user-selectable virtual button (e.g., the user touching a virtual button), electronic device 600 can generate a command and, in response, provide the user a new display with new visual information and display elements, emit one or more audio signals, communicate with another electronic device or server, and/or perform any other function. One skilled in the art will appreciate that the quantity, types, locations, shapes and sizes of user-selectable display elements can change as the display presented by electronic device 600 changes.

Electronic device 600 can also include a transparent grid of piezoelectric actuators, which cannot be seen by the user and/or does not obstruct the display elements included in display 602. The grid of piezoelectric actuators can be used to enable each user-selectable display element, the space between each display element (e.g., empty spaces 608 and/or 610), and/or portions of the display elements to vibrate at unique frequencies and/or amplitudes. For example, virtual buttons 604 and 606 can vibrate at one frequency, while empty spaces 608 and 610 do not vibrate (i.e., remain still). As another example, virtual buttons 604 and 606 can vibrate at the same frequency as empty spaces 608 and 610, but at different amplitudes. As yet another example, empty spaces 608 and 610 can vibrate while user-selectable display elements remain still.

In some embodiments of the present invention, to, e.g., conserve battery power, electronic device 600 can only vibrate when a touch event is occurring. In addition, only the portion of display 602 that is being touched can vibrate (if electronic device 600 is configured to do so).

A display element can also dynamically vibrate to help a user navigate display 602. For example, empty spaces 608 and 610 can vibrate with an increasing (or decreasing) frequency as a touch event approaches a user-selectable display element (e.g., as the user moves his finger on the touchscreen towards a virtual button). Similarly, the vibrational amplitude can also be dynamic and change as a touch event moves around display 602. In this manner, electronic device 600 can enable a user to feel display 602 and track, for example, a user's finger and provide localized haptic feedback.

For example, display 600 can include virtual scroll wheel 612. Virtual scroll wheel 612 includes two user-selectable display elements, button 614 and wheel 616. Piezoelectric actuators, located above (or underneath) the touchscreen presenting display 600, can define the location of virtual scroll wheel 612 by vibrating, while the touchscreen input component simultaneously tracks the user's finger movement. In this manner, electronic device 600 can provide haptic indications of where button 614 and/or wheel 616 are disposed on display 600. This can enable a user to locate virtual scroll wheel 612 without looking at display 600. In addition, button 614 and wheel 616 can vibrate at different frequencies and/or amplitudes to enable the user to non-visually distinguish the boundaries of button 614 and wheel 616. For example, button 614 can vibrate at a higher frequency than wheel 616, which in turn vibrates at a higher frequency than empty space 620 (which surrounds virtual scroll wheel 612).

As another example, a virtual slider, not shown in FIG. 6, can be included in a display and have haptic feedback characteristics. Piezoelectric actuators, located above (or underneath) the touch-based input component, can imitate physical detents along the slider such as, e.g., the half-way position of a Left-Right slider for mixing audio.

In addition, a topographical map, not shown in FIG. 6, can be presented in accordance with the present invention and be associated with vibrational characteristics. Piezoelectric actuators can vibrate at different frequencies and/or amplitudes to enable the user to distinguish features represented on the map (such as, roads, hills, intersections, traffic conditions, driving routes, etc.). In this manner, vibrational characteristics may enable the user to distinguish land from water, mountains from plains, and/or the boundaries of a road without looking at the map.

Figure 7:
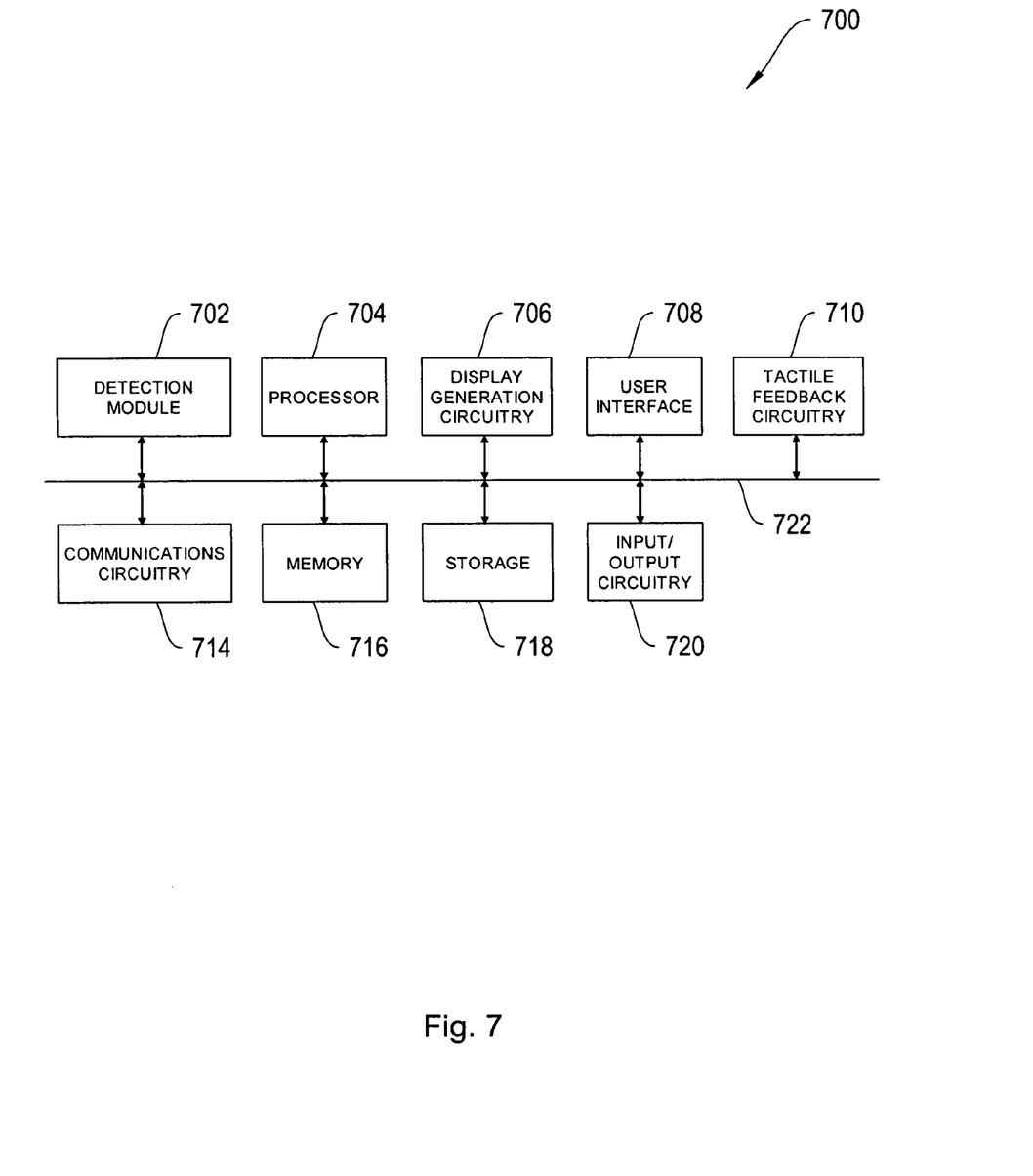
FIG. 7 shows an exemplary block diagram of circuitry that can be included in an electronic device in accordance with some embodiments of the present invention.

FIG. 7 shows a simplified block diagram of circuitry that can be implemented in an electronic device in accordance with some embodiments of the present invention. Electronic device 700 can include detection module 702, processor 704, display generation circuitry 706, user interface 708, tactile feedback circuitry 710, communications circuitry 712, memory 716, storage 718, and input/output circuitry 720. In some embodiments, electronic device 700 can include more than one of each component, but for the sake of simplicity, only one of each component is shown in FIG. 7. In addition, persons skilled in the art will appreciate that the functionality of certain components can be combined or omitted and that additional components, which are not shown or discussed in FIG. 7, can be included in a device that is in accordance with the present invention.

Processor 704 can include, for example, circuitry that can be configured to perform any function. Processor 704 may be used to run operating system applications (including those that implement an audible menu hierarchy), firmware, media playback applications, media editing applications, and/or any other application.

Storage 718 can be, for example, one or more storage mediums, including for example, a hard-drive, flash memory, permanent memory such as ROM, any other suitable type of storage component, or any combination thereof. Storage 718 may store, for example, media data (e.g., music and video data), application data (e.g., for implementing functions on device 700), menu data (used to, e.g., organize data into a menu hierarchy), firmware, user preference data (associated with, e.g., media playback preferences), lifestyle data (e.g., food preferences), exercise data (e.g., data obtained by exercise monitoring equipment), transactional data (associated with, e.g., information such as credit card information), wireless connection data (e.g., data that may enable electronic device 700 to establish a wireless connection), subscription data (e.g., data that keeps track of podcasts or television shows or other media a user subscribes to), contact data (e.g., telephone numbers and email addresses), calendar data, any other suitable data, or any combination thereof. Any or all of the data stored in storage 718 may be formatted in any manner and/or organized as files. Processor 704 can process the data stored on storage 718 into information that can be presented to the user (as, e.g., audible information).

Memory 716 can include, for example, cache memory, semi-permanent memory such as RAM, and/or one or more different types of memory used for temporarily storing data. Memory 716 can also be used for storing any type of data, such as operating system menu data, used to operate electronic device applications and enable the user to interact with electronic device 700.

Communications circuitry 714 can permit device 700 to communicate with one or more servers or other devices using any suitable communications protocol. For example, communications circuitry 714 may support Wi-Fi (e.g., a 802.11 protocol), Ethernet, Bluetooth™, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, GSM, CDMA, SSH, any other type of communications, or any combination thereof.

Input/output circuitry 720 can be respectively coupled to and/or integrated into various input and output components. Examples of input components include microphones, multi-touch panels, proximity sensors, accelerometers, ambient light sensors, camera and any other component that can receive or detect a physical signal or phenomena. Examples of output components include speakers, visual display screens, vibration generators and any other component that can create a physical signal or phenomena. Input/output circuitry 720 can convert (and encode/decode, if necessary) physical signals and other phenomena (e.g., touch events, physical movements of electronic device 700, analog audio signals, etc.) into digital data. Input/output circuitry 720 can also convert digital data into any other type of signal or phenomena. The digital data can be provided to and/or received from processor 704, storage 718, memory 716, or any other component of electronic device 700.

Display generation circuitry 706 is a type of output circuitry that can be included or omitted from electronic device 700 without departing from the spirit of the present invention. Display generation circuitry 706 can accept and/or generate signals for visually presenting information (textual and/or graphical) to a user on a display screen. For example, display generation circuitry 706 can include a coder/decoder (CODEC) to convert digital data into displayable signals. Display generation circuitry 706 also can include display driver circuitry and/or circuitry for driving display driver(s). The display signals can be generated by, for example, processor 704 or display generation circuitry 706. The display signals can provide media information related to media data received from communications circuitry 714 and/or any other component of electronic device 700. In some embodiments, display generation circuitry 706, like any other component discussed herein, can be integrated into and/or external to electronic device 700. In some embodiments of the present invention, such as those that, for example, lack a functional display component, navigational information and any other information may be audibly presented to the user by electronic device 700.

User interface 708 is a type of input circuitry. User interface 708 can accept input(s) from a user and/or generate signals indicating the location or locations of user input, type of user input, direction of user input, etc. For example, user interface 708 can include, for example, a touchpad on a laptop computer, or a click wheel or a touchscreen, such as incorporated into handheld media players, such as Apple Inc.'s iPod™ and iPhone™. (Apple Inc. owns the iPod™ and iPhone™ trademark.) User interface 708 can include circuitry for generating an input signal when it detects user input. In some embodiments, user interface 708, like any other component discussed herein, can be integrated into and/or external to electronic device 700.

Tactile feedback circuitry 710 can selectively activate one or more transparent piezoelectric actuators in response to signals from processor 704. In some embodiments, tactile feedback circuitry 710 can be integrated with display generation circuitry 706, both of which may or may not be integrated into the touchscreen, if one is included in electronic device 700. In the preferred embodiments, electronic device 700 can already be equipped with a high-voltage circuit, such as those used to drive the backlight of an LCD display, which can also be used to provide (relatively) high voltage, low-current control signals for selectively activating the transparent piezoelectric actuators. In other embodiments, the control signals can be provided by a low-voltage, high-current driver circuit so long as the voltage applied to the piezoelectric actuator is sufficient to cause the piezoelectric material to change physical dimensions.

Bus 722 can provide a data transfer path for transferring data to, from, or between detection module 702, processor 704, display generation circuitry 706, user interface 708, tactile feedback circuitry 710, communications circuitry 712, memory 716, storage 718, input/output circuitry 720, and any other component included in electronic device 700.

Figure 8A:
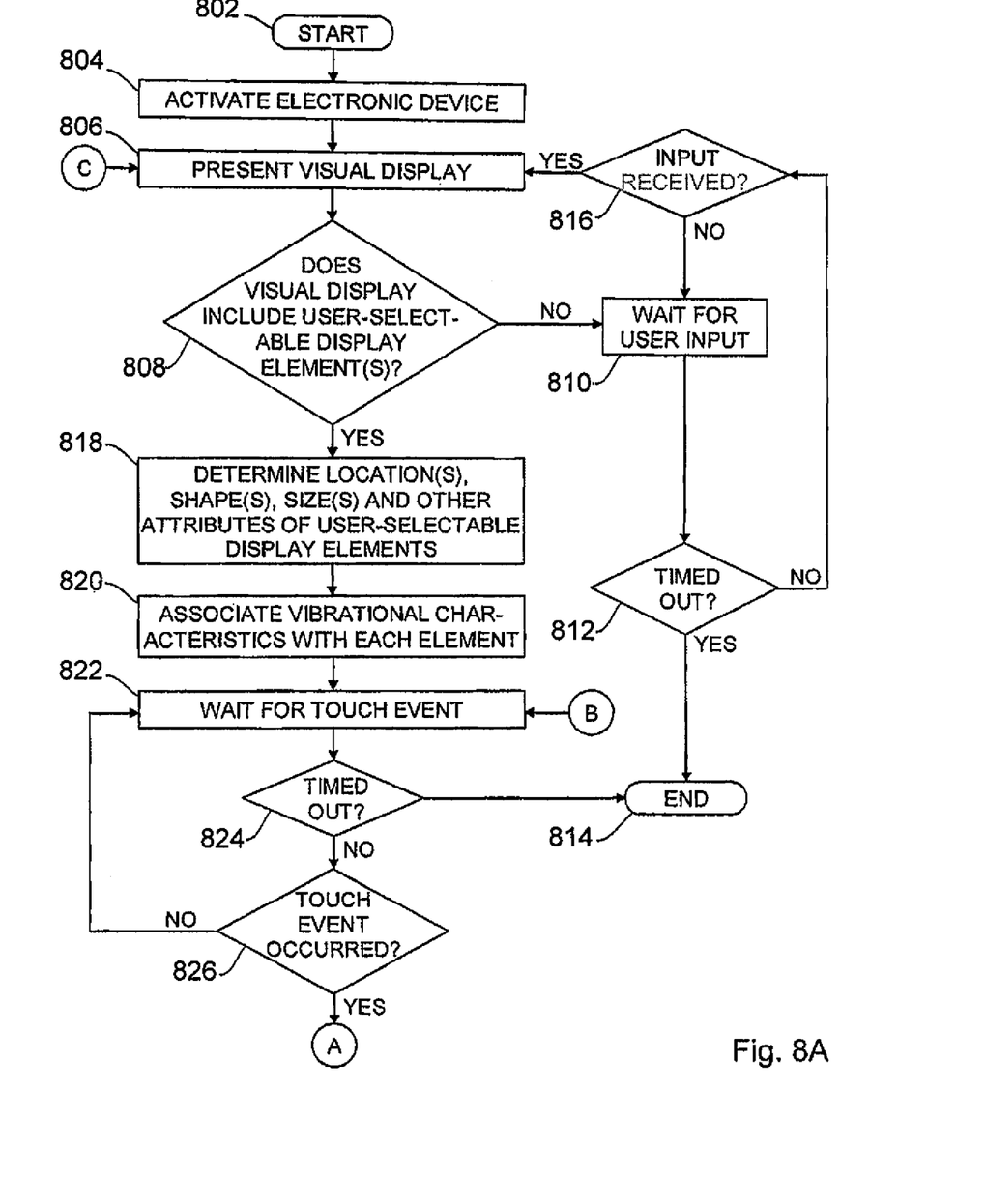
FIGS. 8A and 8B show flowcharts for an exemplary method in accordance with some embodiments of the present invention.
Figure 8B:
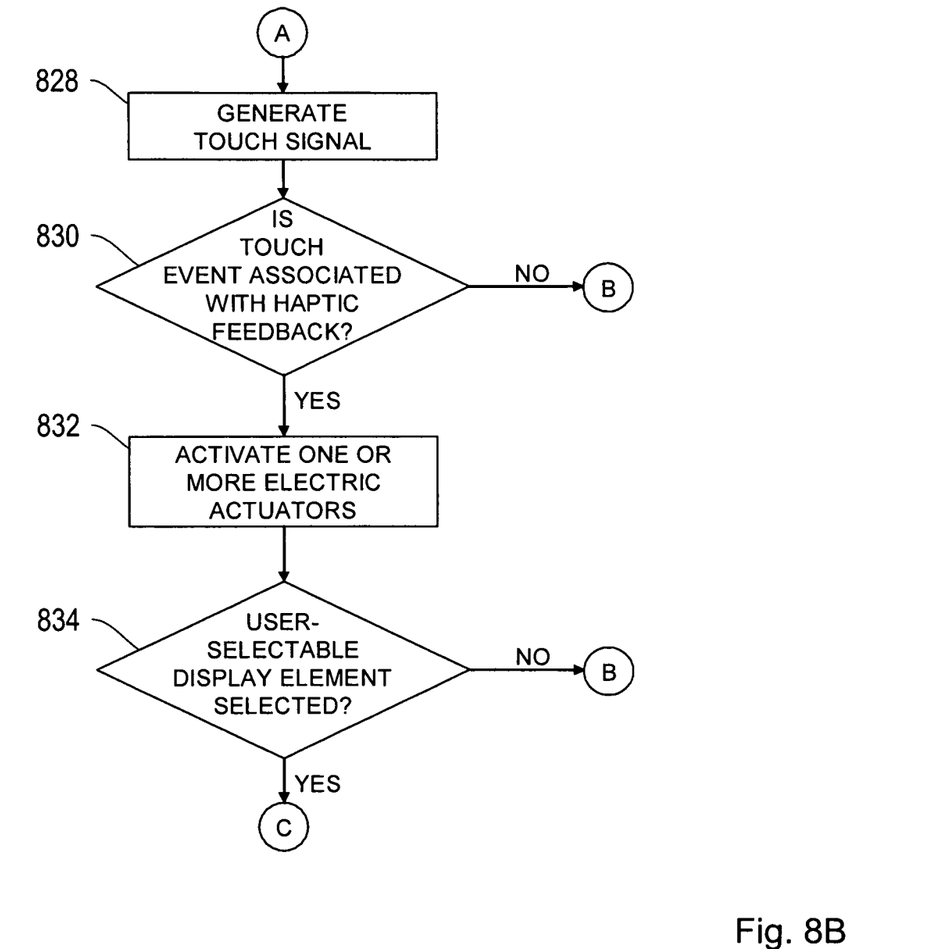

FIGS. 8A and 8B show an exemplary simplified logical flow of an illustrative method of operation of circuitry in accordance with some embodiments of the present invention.

Process 800 starts at step 802 and proceeds to step 804. At step 804, an electronic device, such as a laptop or touch-screen device, is activated in response to, for example, the user pressing a power button, touching a touchpad, or opening a hinged screen. When the device activates, its input/output components, circuitry, etc., including any touch input component and/or visual display can also be activated.

At step 806, the electronic device presents a visual display to the user, for example a logon display, a video playback display, an audio playback display, a notification display, a desktop display, or a menu display, or any other display such as, e.g., display 602 shown in FIG. 6. The visual display may include icons, virtual buttons, hyperlinks, textboxes, and/or other user-selectable input elements.

In other embodiments, such as those implemented by devices without visual display screens, step 806 may be omitted. Dynamic, localized haptic feedback can be used with any type of surface and/or input component of any type of device, including devices without visual displays. Moreover, a device can enter a mode with active, dynamic, localized haptic feedback when the device's display screen is not functioning or in response to a user indicating a desire to use the device in a non-visual mode.

At step 808, the device's processor analyzes the visual display for any user-selectable display elements such as, e.g., icons, virtual buttons, hyperlinks, textboxes, and/or other user-selectable input elements. Cartesian coordinates, for example, can be associated with each user-selectable display element identified in step 808 and can be stored in the memory of the electronic device. If the visual display does not any include user-selectable display elements, process 800 proceeds to step 810.

At step 810, the device waits for user input. At step 812, the processor can compare the amount of time that has passed while waiting for a user input signal with a value stored in memory. If the time spent waiting exceeds the value, process 800 proceeds to end at step 814. If the time spent waiting does not exceed the value, process 800 proceeds to step 816.

At step 816, the device determines whether a user input signal has been received. If a user input signal has been received, process 800 proceeds to step 806. If a user input signal has not been received, process 800 returns to step 810.

If the visual display does include user-selectable data elements, at step 818 the device determines the location(s), shape(s), size(s) and other attributes of user-selectable display elements.

At step 820, the device associates vibrational characteristics with each user-selectable display element. For example, the processor may retrieve from memory vibrational characteristics associated with each user-selectable display element. A user-selectable display element may have no vibrational characteristics. The vibrational characteristics associated with each user-selectable display element may also include vibrational characteristics for the empty space near the user-selectable display element, such as, e.g., empty space 620 around virtual scroll wheel 612 shown in FIG. 6. In some embodiments, the empty space (i.e., areas of the visual display other than user-selectable display elements) may be associated with vibrational characteristics. In some embodiments, the vibrational characteristics can be associated with a user input signal (e.g., a touch event, when generated by a touch-based input component). In such an embodiment, power is conserved by vibrating the device, or a portion of the device, only when the touch event is occurring. In other embodiments, the device, or a portion of the device can vibrate continuously while the display is being presented. In either embodiment, the quantity, types, locations, shapes and sizes of user-selectable display elements can change as the visual display presented by electronic device changes. Thus, one visual display may be distinguished from another by the different combination of vibrational characteristics associated with the user-selectable display elements of the two visual displays.

At step 822, a user interface component or device, such as a touchscreen or touchpad, monitors for user input (such as, e.g., a touch event).

At step 824, the processor can compare the amount of time that has passed while waiting for a user input signal with a value stored in memory. If the amount of time that has passed exceeds the value, the process ends at step 814. For example, process 800 may end by powering down the electronic device, putting the electronic device into a "sleep" state, or locking (or temporarily disabling) the user interface hardware to prevent unintentional user input.

At step 826, the user input components can detect different kinds of user inputs. For example, a proximity sensor can detect a user's finger hovering in close proximity to the surface of, e.g., a touchscreen. A touchscreen may also detect a user's finger pressing on the surface of the touchscreen. A touchscreen may also detect a user's finger dragging across the surface of the touchscreen. When any of the user component's hardware and/or software detect any or a particular user input, process 800 proceeds to step 828.

At step 828, the user input component can generate a corresponding data signal that is sent to, e.g., the electronic device's processor. For example, a touch event can cause the touchscreen to generate a touch signal, which the processor can respond to. The signal can include data that identifies, for example, the type of user input (e.g., tap, slide, press, pinch, etc.), the location or locations of user input, etc.

At step 830, the processor can analyze an input signal (e.g., a touch signal when generated by a touchscreen input component) and determine, for example, whether the location, type, etc. of the input signal is associated with vibrational characteristics. For example, in a touchscreen device, Cartesian coordinates can be associated with a user-selectable display elements or with empty space, and can be stored in the memory of the electronic device. Similarly, each piezoelectric actuator in a grid can be defined by Cartesian coordinates and/or by any other means. The processor can compare the coordinates of the display elements with the location of the input signal. When the location associated with an input signal does not correspond with any user-selectable display element, or with any empty space associated with vibrational characteristics for nearby user-selectable display elements, the electronic device may return to step 812 and wait for another user input. When the location associated with an input signal corresponds to the coordinates of a user-selectable display element of the visual display, or with empty space near a user-selectable display element, the processor determines, based on the vibrational characteristics stored in memory, whether the location of the user input is associated with haptic feedback. Vibrational characteristics can be used to generate actuator control signals that cause one or more piezoelectric actuators to be activated. The actuator control signals can cause one or more piezoelectric actuators to vibrate at, e.g., a particular frequency, amplitude, and/or period as well as for a particular length of time. If the user-selectable display element is associated with vibrational characteristics, process 800 proceeds to step 832.

At step 832, the processor can provide actuator control signals to feedback circuitry, such as tactile feedback circuitry 710. In response, the electronic device can provide localized haptic feedback. As used herein, the term localized, when used in reference to haptic or tactile feedback, refers to one or more specific piezoelectric actuators being active, causing only a portion of the grid of actuators to vibrate. As discussed above, the haptic feedback response may depend on both the type of user input, the user-selectable display element, etc. Furthermore, the haptic feedback response may be predetermined or may be adjustable by the user. In addition, the haptic feedback may be dynamic and change over time, in response to, e.g., a user's interaction (or lack thereof) and/or the passage of time.

For example, if the user's finger lightly touches or hovers above an icon on the touchscreen, the appropriate haptic feedback response may be a weak vibration unique to that icon. The user can identify which icon is beneath the user's finger by the haptic feedback response. Once the user has found the desired icon, the user may select the icon by pressing, tapping or removing the finger from the touchscreen.

At step 834, the processor receives an indication of a user's selection and determines whether a user-selectable display element was selected. In response to the user selecting a display element, the electronic device can generate a response such as, for example, return to step 806 and present the user with a new visual display, emit one or more audio signals, communicate with another electronic device or server, and/or perform any other function.

One skilled in the art would appreciate that the processes described herein can be modified without departing from the spirit of the present invention.

The above disclosure is meant to be exemplary and not limiting. Persons skilled in the art will appreciate that there are additional features in accordance with the present invention that have not been discussed in great detail herein. Accordingly, only the claims that follow are meant to set any bounds.

What is claimed is:

1. A method for enabling non-visual use of an electronic device comprising:
    detecting a touch event on a touch-sensitive display at a location;
    determining whether the touch event is a first type of touch event or a second type of touch event, the first type of touch event and the second type of touch event each comprising at least one gesture; and
    if touch event is the first type of touch event, selectively activating a first subset of a plurality of piezoelectric actuators; and
    if the touch event is the second type of touch event, selectively activating a second subset of the plurality of piezoelectric actuators;
    wherein each of the plurality of piezoelectric actuators share a common electrode.

2. The method of claim 1, further comprising applying a first control signal to the first subset of the plurality of piezoelectric actuators and applying a second control signal to a second subset of the plurality of piezoelectric actuators.

3. A user input component for an electronic device comprising:
    a touch-sensitive surface that detects a touch event at a location;
    a grid of piezoelectric actuators overlaying the touch-sensitive surface, each of the grid of piezoelectric actuators sharing a common electrode;
    circuitry to determine whether the touch event is a first type of touch event or a second type of touch event;
    circuitry to selectively activate a first subset of the piezoelectric actuators included in the grid of piezoelectric actuators at the location of the touch event on the touch-sensitive surface if the touch event is a first type; and
    circuitry to selectively activate a second subset of the piezoelectric actuators included in the grid of piezoelectric actuators at the location of the touch event on the touch-sensitive surface if the touch event is a second type wherein:
        the first type of touch event and the second type of touch event each comprises at least one gesture.

4. The user input component of claim 3, further comprising circuitry to selectively activate the first subset of the piezoelectric actuators based upon the location of the touch event on the touch-sensitive surface and a localized haptic feedback response associated with the location.

5. The user input component of claim 3, wherein the grid of piezoelectric actuators comprises:
    a plurality of transparent electrodes; and
    transparent piezoelectric material arranged as a plurality of nodes disposed between the plurality of electrodes and the common electrode.

6. The user input component of claim 3, wherein the grid of piezoelectric actuators comprises:
    a plurality of electrodes; and
    opaque piezoelectric material arranged as a plurality of nodes disposed between the plurality of electrodes and the common electrode.

7. The user input component of claim 3, further comprising circuitry to selectively activate a first piezoelectric actuator of the first subset of piezoelectric actuators by applying a first control signal to one electrode and applying a second control signal to another electrode.

8. The user input component of claim 3 further comprising an integrated display screen.

9. The user input component of claim 8, wherein the integrated display screen is disposed on top of the grid of piezoelectric actuators.

10. The user input component of claim 8, wherein the integrated display screen is disposed below the grid of piezoelectric actuators.

11. The user input component of claim 3, further comprising circuitry to selectively activate a second subset of the piezoelectric actuators included in the grid of piezoelectric actuators, wherein the first subset of the piezoelectric actuators and the second subset of the piezoelectric actuators each vibrate at a unique frequency.

* * * * *